Figure 1:
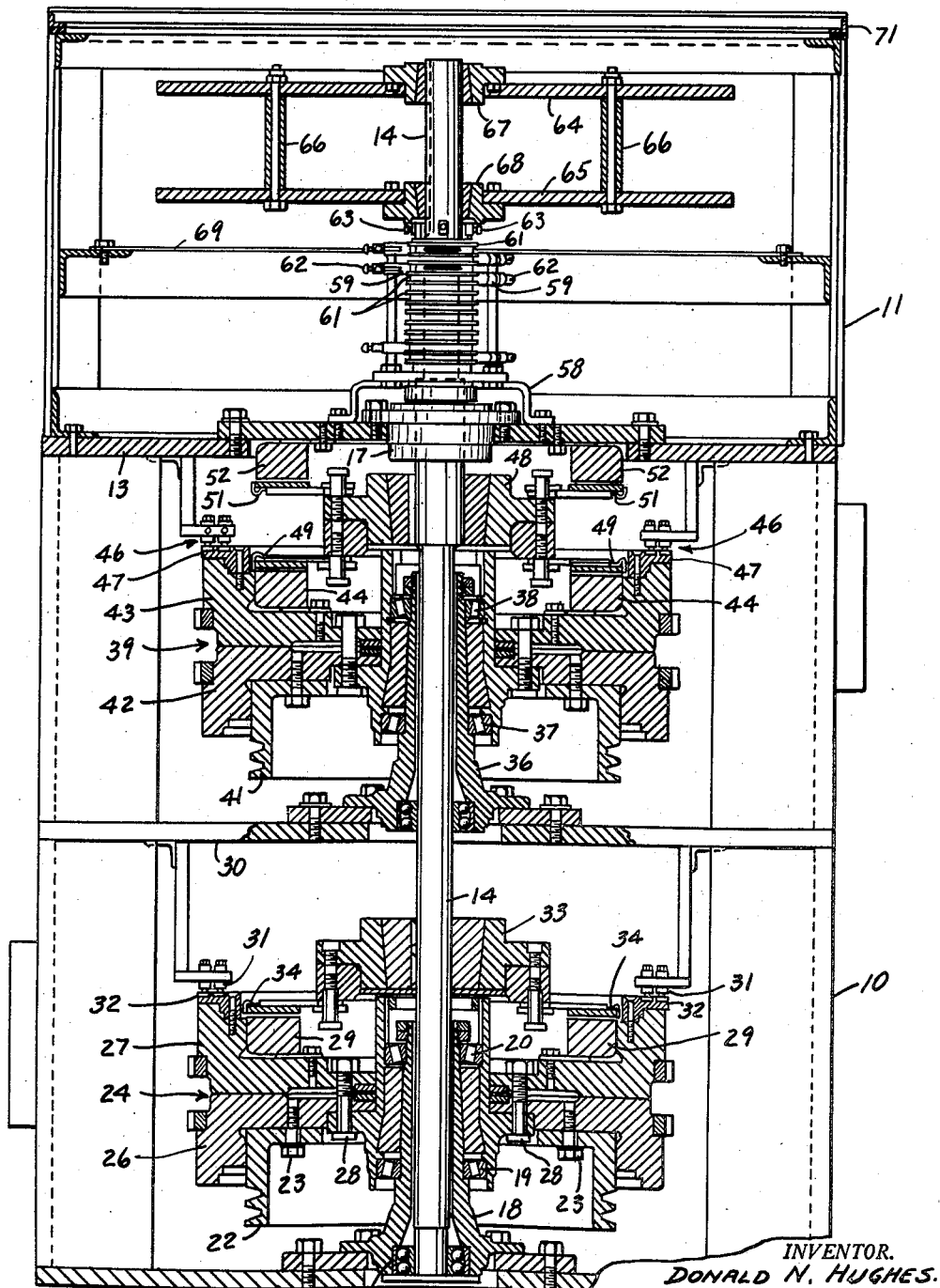

June 23, 1959   D. N. HUGHES   2,891,398
MULTI SPEED CENTRIFUGE
Filed April 29, 1957   2 Sheets-Sheet 2

INVENTOR.
DONALD N. HUGHES.
BY
Lockwood, Galt, Woodard + Smith.
ATTORNEYS.

United States Patent Office 2,891,398
Patented June 23, 1959

2,891,398

MULTI SPEED CENTRIFUGE

Donald N. Hughes, Defiance, Ohio, assignor to The Magnavox Company, a corporation of Indiana Application April 29, 1957, Serial No. 655,855

5 Claims. (Cl. 73—1)

The present invention relates generally to centrifuges and more particularly to multiple speed centrifuges adapted to simulate different degrees of acceleration and deceleration such as occur in the launching and flight of a rocket.

It has been conventional practice to test the fuse mechanisms and other devices connected with the mechanism of a rocket by mounting them in a rocket and firing the rocket. Tests of this nature are extremely costly and result in destruction of the mechanism being tested. Accordingly there is no opportunity for inspection of a fuse or similar device after it has been tested. Obviously correction of design is extremely difficult under these conditions.

Accordingly the principal object of this invention is to provide a testing mechanism capable of simulating the forces created during the normal operation of a complex mechanical system.

A further object of this invention is to provide a testing mechanism capable of simulating the forces of acceleration and deceleration created during the launching and flight of a rocket or other types of missiles or projectiles.

The conventional centrifuge apparatus is not adapted for rapid and economical testing of devices associated with rocket mechanisms because it is necessary to start the centrifuge, run it at the desired speed to create the desired forces of acceleration, and then wait for the centrifuge to slow down to a stop before commencing a second test. This waiting period is expensive under present day conditions.

Accordingly another object of this invention is to provide a centrifuge which may be stopped quickly and rapidly re-accelerated to repeat a test or re-accelerated to perform another test simulating different conditions from those of a previous test.

Still another object of this invention is to provide a centrifuge having a plurality of flywheels, each of which may be driven at different speeds and each of which may be selectively activated to control a test procedure simulating operation of a complex mechanical system.

Another object of this invention is to provide centrifuge apparatus adapted to simulate the forces created during launching and flight of the rocket wherein the testing time is relatively short and testing conditions are constant and under the immediate control of an operator.

In accordance with this invention, there is provided a centrifuge having a shaft and a specimen supporting member mounted for rotation with said shaft, a plurality of flywheels adapted to be driven at different speeds, clutch means associated with each flywheel and controllable to connect each flywheel to said shaft whereby said shaft may be driven at different speeds, and brake means operatively associated with said shaft for stopping its rotation.

Figure 2:
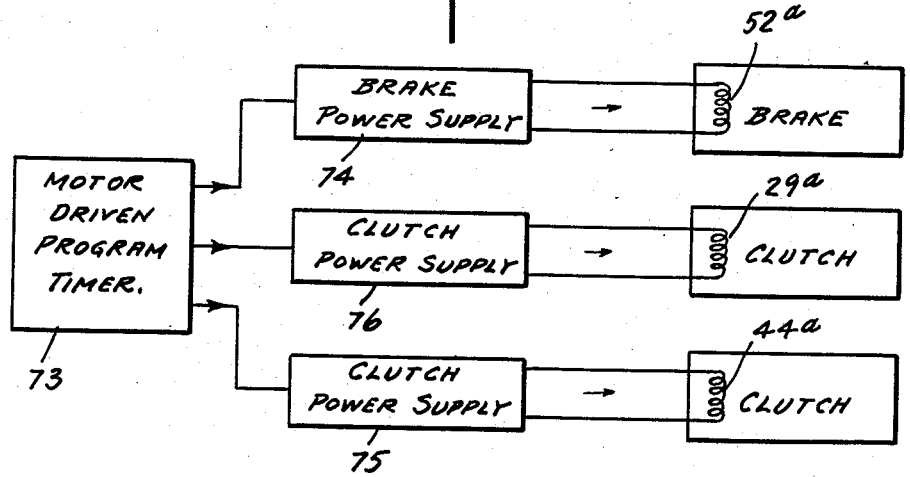

The full nature of the invention will be understood from the accompanying drawing and the following description and claims:

Fig. 1 is a side elevation having portions broken away and illustrating the centrifuge provided in accordance with this invention; and Fig. 2 is a schematic circuit diagram illustrating a means of controlling the apparatus illustrated in Fig. 1.

The embodiment of the present invention herein disclosed comprises a lower frame 10 and an upper frame 11, the lower frame having a base plate 12 and a top plate 13. A vertical shaft 14 extends centrally through the frames 10 and 11 and is suitably journaled for rotation in a lower bearing 16, carried by the plate 12, and an upper bearing 17 mounted on the plate 13. The plate 12 carries a sleeve 18 coextensive with the lower portion of the shaft 14. Mounted for rotation about the stationary sleeve 18 is a flywheel and magnetic clutch assembly 24, the rotational mounting for this assembly utilizing inner and outer bearings 19 and 20. The flywheel and clutch assembly comprises a sheave 22 having circumferential grooves therein adapted to receive a multiple V-belt (not shown) which couples the sheave to a variable speed transmission driven by a suitable driving means such as an electric motor. Rigidly secured to the sheave 22 by means of bolts 23 is a flywheel comprising upper and lower sections 26 and 27 which are locked together by means of the bolts 28. Secured to the upper face of the flywheel section 27 is a magnet 29 which forms a part of an electromagnetic clutch mounted for rotation with the flywheel assembly. A conventional brush holder assembly, which includes plurality of brushes or contact rollers 31, is carried by an intermediate plate 30 and transmits electrical power to the coil 29a (Fig. 2) of the electromagnetic clutch by cooperation of the brushes 31 with accommodating peripheral grooves in a collector ring 32 carried by the upper flywheel section. A hub 33 is suitably keyed for rotation with the shaft 14 and carries an annular armature member 34 which cooperates with the upper face of the magnet 29.

The intermediate plate 30 carries a second flywheel and clutch assembly similar in most respects to that carried by plate 12. Sleeve 36, similar to the sleeve 18, has journaled thereon by means of inner and outer bearings 37 and 38, a flywheel and magnetic clutch assembly 39 similar to the assembly 24 previously referred to. The assembly comprises a sheave 41 coupled to a suitable driving means (not shown) such as an electric motor through a multiple V-belt drive and a variable speed transmission. A lower flywheel section 42 is secured to the sheave 41, and in turn is rigidly secured to an upper flywheel section 43 which carries thereon an electromagnet 44, similar to the magnet 29 previously referred to and forming a component of an electromagnetic clutch. A brush assembly is carried by the plate 13 and includes a plurality of brushes 46 which are accommodated within appropriate peripheral grooves in a collector ring conductor 47 carried by the flywheel section 43. The brush assembly functions to transmit electrical power to the coil 44a (Fig. 2) of the electromagnetic clutch in conventional fashion.

A hub 48 is suitably keyed for rotation with the shaft 14 and carries an armature member 49 similar to the armature member 34 which cooperates with the electromagnet 44. The hub 48 also carries an armature member 51, similar to the armature member 49, adapted to cooperate with a fixed electromagnet 52. It will be understood that the electromagnet 52 and the armature 51 form an electromagnetic brake assembly which, upon energization of the coil 52a (Fig. 2) of the fixed electromagnet, functions to slow or stop rotation of the shaft 14.

A stationary support 58 serves to mount a conventional brush assembly which includes the brushes 59 adapted to cooperate with collector rings 61 mounted on shaft 14.

The brushes 59 are provided with electrical terminals 62 and the collector rings are connected in conventional fashion to electrical terminals 63.

A specimen mounting table assembly, comprising upper and lower plates 64 and 65 separated by spacers 66, is mounted for rotation with the shaft 14 by means of the hubs 67 and 68 which are suitably keyed thereto. A testing fixture, of the type shown in my copending application Serial No. 573,753, filed March 26, 1956, may be mounted on the table assembly and a specimen, such as a rocket fuse, may be suitably secured thereto. Electrical instrument circuits may be maintained to the specimen through the terminals 62, brushes 59, collector rings 61 and through wires (not shown) which may be connected from the terminals 63 to the specimen. A deck plate 69 serves to separate the area accommodating the specimen mounting table from the area accommodating the clutch and brake assemblies, and a removable closure 71 serves to cover the table assembly when the apparatus is in operation.

Fig. 2 of the drawings illustrates schematically an electrical system adapted automatically to start and stop the centrifuge for carrying out test procedures. For example, there may be provided a motor driven program timer 73 consisting of cam operated switches arranged with respect to one another to control the brake power supply 74, the clutch power supply 75 and the clutch power supply 76 in such a manner that the centrifuge may be operated through successive cycles of operation as will be described subsequently. The particular system shown in Fig. 2 forms no part of this invention and accordingly it is disclosed herein only for the purpose of explaining the utility of this invention.

In operation, assuming the driving means for the sheaves 22 and 41 are energized and that the electromagnetic clutches formed by the magnets 29 and 44 and the armatures 34 and 49, respectively, are de-energized, the flywheel assemblies 24 and 39 will be rotating about the shaft 14, it being understood that sheaves 22 and 41 are rotated at differing speeds depending on the speed of rotation of their associated driving means. Assuming the magnetic brake formed by the magnet 52 and the armature 51 is energized, the shaft 14 is held stationary. With a test specimen suitably mounted upon the table formed by the plates 64 and 65, the test sequence may be initiated by starting the program timer 73 which in turn functions to control the brake power supply 74 to open the circuit to the magnet brake coil 52a thereby releasing the shaft 14 for rotation. Subsequently, the program timer functions to energize the magnetic clutch coil 44a from clutch power supply 75. This clutch magnetically locks the shaft 14 to the rotating flywheel assembly 39; the shaft 14, and consequently the specimen table, are thus quickly brought to the speed of the rotating flywheel assembly.

After a predetermined period of time, the program timer operates power supply 75 to de-energize coil 44a and energize magnetic brake coil 52a. This operation functions to disengage the shaft from the flywheel assembly 39 and to bring the shaft to a stop in a very short period of time. The program timer 73 may continue the test sequence by then immediately de-energizing the magnetic brake coil 52a and energizing from power supply 76 the magnetic clutch coil 29a. This operation quickly brings the shaft 14, and consequently the specimen table, to the speed of the rotating flywheel assembly 24. Then the magnetic clutch coil 29a may be de-energized, after a certain period of time, and the magnetic brake coil 52a may be energized from power supply 74, thereby bringing the shaft and the specimen table to a stop.

It will be understood that, in the typical operating cycle just described, the rotation of the shaft by the flywheel assemblies 39 and 24, may be at differing, preselected speeds, and that the initiation, termination and the duration of portions of the operating cycle may be appropriately controlled by the timing or programming apparatus 73. By controlled operation of the electrical brake the shaft, and consequently the specimen table, may be slowed, stopped, or held, as desired. By driving the flywheels at different speeds and engaging and disengaging the clutches and brakes in proper sequence, a wide variety of acceleration curves may be simulated, this flexibility of the operating sequence being particularly advantageous in the testing of fuses and related components to be used in rockets.

The invention has been described with reference to testing of fuses for missiles and projectiles, but it will be readily understood by those skilled in the art that the control system shown in Fig. 2 may be adapted to cause acceleration and deceleration of the several flywheels in such a manner as to simulate forces created during the operation of many different types of mechanical systems.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A multi speed centrifuge comprising a frame, a shaft positioned vertically within the frame and journaled for rotation thereon, a specimen mounting table carried by the shaft adjacent its upper end, means providing electrical connections to the table including collector rings carried by the shaft and a cooperating brush assembly carried by said frame, electrically operable brake means for the shaft comprising an electromagnet carried by the frame and an armature carried by the shaft, a plurality of shaft rotating drive means each composing a flywheel mounted for rotation on said frame concentrically about the shaft, an electromagnetic clutch associated with each of said flywheels comprising magnet and armature members, the magnet member being carried by its associated flywheel and the armature member being carried by the shaft, and electrical connecting means extending between said frame and said flywheel to permit remote, sequential energization of said electromagnetic clutches and said brake means thereby sequentially stopping and rotating said shaft and said table at speeds corresponding to the respective speeds of said flywheels.

2. A multi speed centrifuge comprising a frame, a shaft positioned vertically within the frame and journaled for rotation thereon, a specimen accommodating element carried by the shaft adjacent its upper end, means providing electrical connections to the element, electrically operable brake means for the shaft, a plurality of shaft rotating drive means each comprising a flywheel mounted for rotation on said frame concentrically about the shaft, an electromagnetic clutch associated with each of said flywheels comprising magnet and armature members, one of said members being carried by its associated flywheel and the other of said members being carried by the shaft, and electrical connecting means extending between said frame and said electromagnetic clutches to permit sequential energization of said clutches thereby sequentially rotating said shaft and said specimen accommodating element at speeds corresponding to the respective speeds of said flywheels.

3. A multi speed centrifuge comprising a frame, a shaft positioned vertically within the frame and journaled for rotation thereon, a specimen accommodating element carried by the shaft, means providing electrical connections to the element including collector rings carried by the shaft and a cooperating brush assembly carried by said frame, electrically operable brake means for the shaft carried by said frame, a plurality of shaft rotating drive means each comprising a flywheel mounted on said frame for rotation concentrically about the shaft, an electromagnetic clutch associated with each of said flywheels adapted to transmit the rotary motion of the flywheels to said shaft upon clutch energization, and electrical connecting means extending between said frame and clutches to permit remote, sequential energization of said electromagnetic clutches thereby sequentially rotating said shaft and said specimen accommodating element at speeds corresponding to the respective speeds of said flywheels.

4. A multi speed centrifuge comprising a frame, a shaft positioned vertically within the frame and journaled for rotation thereon, a specimen accommodating element carried by the shaft, intermittently operable brake means for the shaft, a plurality of shaft rotating drive means each comprising a flywheel mounted on said frame for rotation concentrically about the shaft, a clutch associated with each of said flywheels, said clutches each comprising a member rotated with its associated flywheel and a member rotated with said shaft to thereby transmit the rotary motion of the flywheels to the shaft upon clutch energization, said clutches being adapted to be sequentially energized to rotate said shaft and said specimen accommodating element at speeds corresponding to the respective speeds of said flywheels.

5. A multi speed centrifuge comprising a frame, a shaft positioned vertically within the frame and journaled for rotation thereon, a specimen accommodating element carried by the shaft adjacent its upper end, means providing electrical connections to the element including collector rings carried by the shaft and a cooperating brush assembly carried by said frame, electrically operable brake means for the shaft comprising a magnet member and an armature member, one of said members being carried by the shaft and the other being carried by said frame, a shaft rotating drive means comprising a flywheel mounted for rotation concentrically about the shaft, an electromagnetic clutch associated with said flywheel comprising magnet and armature members, one of said members being carried by the flywheel and the other of said members being carried by the shaft, and electrical connecting means extending between said frame and said flywheel to permit remote, sequential energization of said electromagnetic clutch and said brake thereby intermittently rotating said shaft and said specimen accommodating element at a speed corresponding to the speed of said flywheel.

References Cited in the file of this patent

UNITED STATES PATENTS

| | | |
|---|---|---|
| 2,127,950 | Bennett | Aug. 23, 1938 |
| 2,465,437 | Engelhardt | Mar. 29, 1949 |
| 2,779,448 | Lambach et al. | Jan. 29, 1957 |
| 2,788,654 | Wiancko et al. | Apr. 16, 1957 |